United States Patent [19]

Swinkels et al.

[11] Patent Number: 4,836,990
[45] Date of Patent: Jun. 6, 1989

[54] REMOVAL OF ORGANICS FROM BAYER PROCESS STREAMS

[75] Inventors: Dominicus A. Swinkels, Adamstown Heights; Kevork Chouzadjian, Charlestown, both of Australia

[73] Assignee: The Broken Hill Proprietary Company Ltd., Victoria, Australia

[21] Appl. No.: 88,493

[22] Filed: Aug. 13, 1987

Related U.S. Application Data

[63] Continuation of Ser. No. 824,018, filed as PCT AU85/00098 on May 1, 1985, published as WO85/05095 on Nov. 21, 1985, abandoned.

[30] Foreign Application Priority Data

May 3, 1984 [AU] Australia ................. PG4817/84

[51] Int. Cl.$^4$ .............................................. C01F 7/46
[52] U.S. Cl. .................................. 423/130; 423/121; 423/600; 423/625

[58] Field of Search ................ 423/121, 130, 600, 625

[56] References Cited

U.S. PATENT DOCUMENTS 3,457,032 7/1969 Breteque ........................... 423/600
3,512,926 5/1970 Mercier et al. ..................... 423/600

FOREIGN PATENT DOCUMENTS 481543 8/1975 U.S.S.R. .
266225 2/1927 United Kingdom .

Primary Examiner—Robert L. Stoll
Attorney, Agent, or Firm—Armstrong, Nikaido, Marmelstein & Kubovcik

[57] ABSTRACT

A liquor of the Bayer process, as defined, is contacted with manganese dioxide to oxidize organic material in the liquor. When the liquor is the seed wash liquor, oxalates in particular are oxidized.

11 Claims, 6 Drawing Sheets

REMOVAL OF ORGANICS FROM BAYER PROCESS STREAMS

This application is a continuation of Ser. No. 824,018 filed as PCT AU85/00098 on May 1, 1985, published as WD85/05095 on Nov. 21, 1985, now abandoned.

The present invention relates to the Bayer process for producing alumina from bauxite, and in particular relates to the removal of organic material which accumulates in liquors during the process.

The term "Bayer process" as used throughout this specification, including the claims, is understood to mean a process which comprises at least (a) digesting bauxite in sodium hydroxide to form a solution containing sodium aluminate, (b) precipitating aluminium hydroxide from the solution, and (c) calcining the precipitate to form alumina, and which may include further optional steps in addition to steps (a), (b) and (c). The solution, or any other liquor present in steps (a), (b) or (c) or in any of the optional steps, is commonly referred to as "Bayer liquor".

Bauxite ores usually contain organic material. The term "organic material" as used throughout this specification, including the claims, is understood to mean compounds containing carbon, other than carbonates. Typically, the bauxite ores contain from 0.1 to 0.4% organic material and on digestion, between 50 and 90% of the organic material may be extracted into the Bayer liquor. Since in the Bayer process the liquor remaining after the precipitation step is recycled to the digestion step, the concentration of organic material gradually increases.

The organic material which is extracted into Bayer liquor may be classified into three distinct groups:
1. humic acids, freshly extracted high molecular weight material and its initial degradation products of molecular weight greater than 500;
2. intermediate degradation products which constitute the building "blocks" of the large humic molecules, e.g. benzenecarboxylic acids and phenolic acids;
3. the lower molecular weight degradation products, primarily oxalate, formate and acetate.

One compound containing organic material from group 3 above is sodium oxalate ($Na_2C_2O_4$), which is often responsible for a number of processing and operating difficulties, especially when it precipitates as fine needle shaped crystals. These crystals act as nucleation sites during the precipitation step and promote further precipitation of fine aluminium hydroxide. Aluminium hydroxide is also known in the art as alumina trihydrate, hydrated alumina or simply hydrate. Sodium oxalate may also precipitate on the surface of aluminium hydroxide crystals, deactivating the surface and effectively reducing the surface area available for crystal growth. At certain critical concentrations of aluminate ion, the surface area available for orderly precipitation is insufficient, and a disorderly spontaneous secondary nucleation occurs. The main disadvantage of producing excessive fines under these circumstances is that they cannot readily be agglomerated to coarse particles in the presence of oxalate. Furthermore, where agglomeration of oxalate contaminated particles occurs, the agglomerates are weak and tend to break up on calcination, giving rise to more fines and thereby degrading the particle size distribution of the product. The generation of fines is an important consideration, since in many aluminium smelters a controlled particle size distribution with a minimum of fines is required for satisfactory aluminium production.

Other known effects of organic materials in general dissolved in the Bayer process include:
1. foaming of liquor under agitation, causing poor utilization of tank capacity and generation of caustic aerosols into the atmosphere which pose a safety hazard;
2. stabilization of supersaturated liquors with the result that comparatively higher concentrations of aluminate ion per unit volume are required to obtain the same productivity of alumina from solution;
3. an increase in viscosity of the liquor, resulting in poorer settling of red muds and poorer filtration of aluminium hydroxide;
4. a lowering of the causticity of the liquor, thereby increasing consumption of sodium hydroxide;
5. undesirable soda contamination of the product alumina.

Considerable research has been devoted to controlling organic material such as oxalate in the Bayer process. Known methods for controlling organic material include electrolytic, chemical and high pressure air/oxygen oxidations, massive sorption of organic material by carbon, alumina and ion exchange resins, as well as hydrate seed washing and subsequent precipitation of oxalates by alkaline earth metals. The principal types of processes for removing organic material may be summarized as follows:

Oxidation of Organic Materials

There are a number of known processes based on oxidising organic material in Bayer liquors to form carbonate. Generally the processes are either highly energy intensive or require the use of expensive reagents which in some instances may result in a hazardous working environment.

In one process disclosed in Showa Denko KK Japanese patent No. 83046451 coloured organic material (i.e. relatively high molecular weight organics) is oxidised by ozone, hydrogen peroxide or sodium peroxide.

U.S. Pat. No. 4,215,094 in the name Sumitomo Aluminium Co. Ltd. discloses another process in which organic material is oxidised in an environment containing oxygen at elevated temperatures in the presence of copper ions which act as a catalyst for oxidation. A paper by the inventors of the process published in "Light Metals" 1981 (editor G. M. Bell) discloses that other catalysts such as silver and iron ions can be used. The paper also presents experimental data indicating that organic material can be oxidised in air without the use of a catalyst. However it is evident from the U.S. patent that oxidation under these conditions without a catalyst requires long oxidation periods.

Furthermore, a paper by G. Lever and B. Gnyra presented at the 108th Annual Meeting of AIME in New Orleans during 1979 indicates that whilst oxidation of organic material in air is possible under laboratory conditions (at high temperatures and pressure), in practice under Bayer digestion conditions the formation of carbonate proceeds at a much slower rate than the net build-up of organic material. The paper also reports that work on electrolytic oxidation and oxidation by powerful oxidising agents (peroxides) was abandoned at laboratory scale experimentation stage.

As will be evident from the above, processes for removing organic material which are based on oxidation generally have not been successful under actual Bayer process conditions. As a consequence alumina producers have tended to move away from such processes.

Precipitation of Oxalates U.S. Pat. No. 4046855 in the name Gebruder Giulini GmbH discloses a process for precipitating oxalates. In the process magnesium compounds are added to Bayer liquor form a gel-like hydroxide mixture containing magnesium hydroxide and aluminium hydroxide which precipitates from the liquor. The precipitate is maintained in contact with the liquor and scavenges at least part of the organic material. Suitable magnesium compounds are those compounds which react with Bayer liquor to form a fine particle gel-like hydroxide mixture. A preferred magnesium compound is technical kieserite (comprises 97% $MgSO_4H_2O$)

The process has a number of disadvantages. First, the precipitation of the gel-like hydroxide mixture is fairly difficult to achieve, and second precipitation is dependent on process parameters which are not clearly identified. Further, losses of valuable alumina are incurred due to the formation of 5 $MgO$ $Al_2O_3$ which is taken out of the Bayer liquor when the hydroxide mixture and scavenged organic material is removed.

A paper by J. Deabriges, M. Noble and R. Maycone in "Light Metals" 1978 describes a process in which barium aluminate is dissolved in Bayer liquor, resulting in precipitation of barium oxalate with considerable quantities of barium carbonate. This process has several significant disadvantages. First, barium is an expensive and toxic reagent and has to be recovered and recycled. This can only be achieved by the calcination of the precipitated barium salt with $Al_2O_3$ in a 1.1:1 mole ratio at temperatures in excess of 1000° C. The resultant product is $BaAl_2O_4$ which can be recycled to the initial digestion in the Bayer process. Second, calcination aspects of the process are energy intensive and the conversion of all the precipitated barium to $BaAl_2O_4$ is far from complete.

Australian patent application No. 27035/84 (corresponds with U.S. Pat. No. 4,443,416) in the name Kaiser Aluminium and Chemical Corporation describes a process for precipitating sodium oxalate by adding to Bayer liquor a solution with a concentration of sodium hydroxide in the range 400 to 730 grams/liter so that the concentration of caustic in the resultant Bayer liquor-solution exceeds 250 grams/liter (calculated as $Na_2CO_3$). The process is carried out at 20° to 85° C. for 35 to 180 minutes, after which time the precipitated sodium oxalate is filtered and treated with calcium hydroxide to recover the caustic.

U.S. Pat. No. 3,649,185 in the name Showa Denko KK describes a similar process in which sodium oxalate is precipitated by increasing the concentration of sodium hydroxide in the liquor. In a preferred embodiment, calcium hydroxide is added to the liquor to increase the concentration of sodium hydroxide.

A paper by J. L. Moneta Benito in "Light Metals" 1978 describes a process for controlling the build-up of oxalate and other impurities, which is in use at the Alumina Espanola refinery at San Ciprian. The process involves concentrating the liquor by evaporation which then "salts out" the organic materials.

U.S. Pat. Nos. 4,275,043 and 4,275,042 in the name Alcan Research and Development Limited describe processes in which precipitation of sodium oxalate from super-saturated Bayer liquor is stimulated by removing humic matter from the liquor. The humic matter is absorbed by either activated carbon or a cationic sequestrant.

U.S. Pat. No. 3,899,571 in the name Sumitomo Aluminium Co. Ltd. and West German patent No. 2,807,209 in the name Nippon Light Metal Co. Ltd. disclose processes for precipitating organic material from Bayer liquors by adding fresh crystals of sodium oxalate or other salts.

Generally, the disadvantage with processes that precipitate sodium oxalate is that unless the precipitated sodium oxalate is thermally decomposed to yield a sodium salt which may be recycled within the plant, the sodium oxalate must be discarded with a consequential loss of sodium values. Caustification of sodium oxalate with calcium hydroxide is not satisfactory in a closed system, as it has been found that the calcium oxalate formed decomposes with time thus returning oxalate to the system. Thermal decomposition of sodium oxalate is not favored because of operating difficulties which result. It is also expensive in terms of energy consumption, particularly since a substantial amount of water must be evaporated from the cake before calcination proceeds.

It is an object of the present invention to provide a method for reducing the concentration of organic material such as oxalate from the Bayer liquor which alleviate the disadvantages described in the preceding paragraphs.

In accordance with the present invention, there is provided, in the Bayer process as hereinbefore described for forming alumina, an improvement comprising contacting liquor of said Bayer process containing organic material as hereinbefore described with manganese dioxide to oxidise organic material in the liquor.

It is preferred that the total soda concentration in the liquor during oxidation is less than 50 grams per liter. Preferably, the liquor subsequently comprises or is included in the solution resulting from the digestion of bauxite. Such a liquor comprises the seed wash liquor, from which the organic material oxidised is oxalate. In one preferred arrangement, the seed wash liquor is passed through a fluidized bed reactor filled with manganese dioxide and the process conditions are selected so that the temperature of the seed wash liquor is between 100° and 270° C. and the residence time within the reactor is between 0.5 and 4 hours. If 100% oxidation of the oxalate in the liquor is required it is preferred that the mole ratio between the manganese dioxide ions and oxalate is greater than 7.

The liquor may alternatively or additional comprise liquor in which bauxite is being or has been digested to form the solution containing sodium aluminate. For example, manganese dioxide may be added to the liquor during digestion of the bauxite.

BRIEF DESCRIPTION OF THE DRAWINGS

Further detailed description of one preferred embodiment of the present invention is now provided with reference to the accompanying drawings in which:

With reference to FIG. 1, typically the Bayer process as practised commercially comprises the following steps, the following numbered paragraphs corresponding with the numbered process steps shown in the figure:

Figure 1:
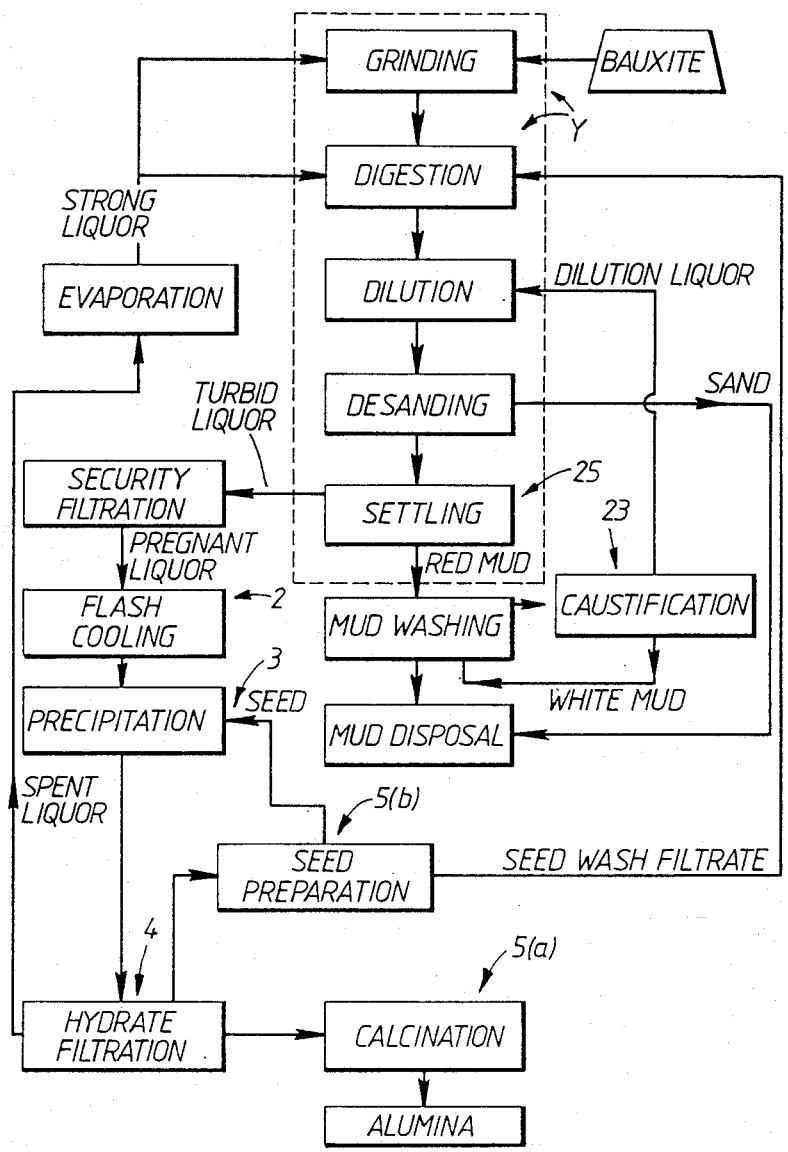
FIG. 1 is a flow sheet of a conventional Bayer process.

1. Bauxite is ground and then digested in a sodium hydroxide solution to selectively remove hydrated aluminium oxide from the insoluble oxides and other insoluble material in the bauxite by transferring it into solution in the form of dissolved sodium aluminate. The process conditions required vary with the composition of the specific bauxite ore used. Typically, temperatures between 140° and 240° C. are used with sodium hydroxide concentrations up to 25 weight percent. Digestion conditions are a function of the bauxite ore used. Such parameters as sodium hydroxide concentration, digestion temperature, residence time in digestion and pre or post digestion holding time to complete reaction with soluble silicaceous minerals are all determined by experiment to give optimum extraction of alumina, removal of soluble silica and minimum energy consumption.

The insoluble oxides and silicates and other insoluble material remaining after digestion are commonly known as red mud and are separated from the liquor containing dissolved sodium aluminate by conventional settling, countercurrent decantation and filtration techniques.

2. The liquor is then flash cooled to reduce the solution temperature to between 50 and 90° C.

3. The cooled liquor is then transferred to precipitation tanks where the sodium aluminate is allowed to decompose with the result that fine aluminium hydroxide precipitates form. Precipitation is controlled by the addition of fine alumina trihydrate particles, elutriated from previously prepared particles, which act as nucleation sites for precipitation of aluminium hydroxide. The residence time in the precipitation tanks varies depending on the temperature conditions, the nature of the seed particles and the amount of precipitate required to be formed from solution.

4. After the required amount of precipitation has taken place, the precipitates are filtered from the remaining liquor, washed and the coarser particles are separated from the remaining fine particles. The remaining liquor is reconcentrated and recycled with makeup sodium hydroxide solution to the digestion step 1 above.

5.(a) The coarser particles are transferred to large rotary kilns or fluid bed calciners heated to 1100° to 1200° C. Under such temperature conditions the aluminium hydroxide decomposes and undergoes a series of changes in both composition and structural form with essentially no change in particle size. The resultant product alumina is suitable for subsequent use in the electrolytic production of aluminium.

5.(b) The fine particles are used as the basis for the seed particles described in step 3 above. Preparation of suitable seed particles involves washing the particles with water to dissolve any sodium oxalate precipitates which form during the precipitation step 3 above. The seed wash filtrate, commonly referred to as "seed wash liquor", is then returned for introduction into the digestion step 1 above and the filtered seed particles are retained for use in the precipitation step 3 above.

It can be appreciated that liquor containing sodium aluminate in solution is separated from solid material at both the precipitation and seed particle washing steps, and is subsequently recycled for reuse during the digestion step.

Thus, since a significant proportion of organic material in the bauxite is extracted into the liquor during the digestion step, there will be an increasing concentration of organic materials such as oxalate in the recycling liquor.

The present invention is based on the realisation, following extensive research that the concentration of organic material in Bayer liquor can be reduced by the addition of manganese dioxide to oxidise the organic material to form reaction products which do not have a detrimental effect on the Bayer process.

The research work was carried out on synthetic and actual Bayer liquors and concentrated on the following three areas.

1. Oxidation of oxalate in synthetic Bayer liquors.
2. Oxidation of organic material in actual Bayer liquors having low soda concentrations.
3. Oxidation of organic material in actual Bayer liquors having high soda concentrations.

1. Oxidation of sodium oxalate in Synthetic Bayer liquors

A series of experiments was conducted on synthetic Bayer liquors prepared by digesting aluminium hydroxide and sodium hydroxide in an autoclave at 120° C. for 0.5 hours, and then adding sodium carbonate and sodium oxalate.

In a first series of experiments the effect of total soda concentration and manganese dioxide ore loadings on oxidation of oxalate was investigated. Manganese dioxide ore from Groote Eylandt was added to samples of synthetic liquors having concentrations of total soda varying from 9 to 93.5 g/l. The amounts of manganese dioxide ore added was selected so that the samples had three different mole ratios of manganese dioxide to oxalate, namely 1.15:L 2.30:1 and 4.60:1. The samples were heated at 240° C. for 1 hour, and then cooled and analysed for oxalate.

The results of the experiments established that the total soda concentration has a significant effect on oxidation of oxalate. In this regard, as can be seen from the plot of % oxalate oxidation vs. total soda concentration shown in FIG. 2, the % oxidation of oxalate decreases as the total soda concentration increases.

For example, at a mole ratio of manganese dioxide to oxalate of 1.15:1, 43% of the oxalate was removed from liquor having a low total soda concentration of 9 g/l whereas only 10% of the oxalate was removed from liquor having a relatively high total soda concentration of 93.5 g/l. It is evident that at this manganese dioxide ore loading for efficient oxalate oxidation a total soda concentration of less than 50 g/l is desirable. However, it should be emphasized that the results of the experiments establish that oxidation of oxalate does occur in synthetic liquors having relatively high total soda concentrations, notwithstanding that higher levels of oxidation are possible in synthetic liquors having low total soda concentrations.

Figure 2:
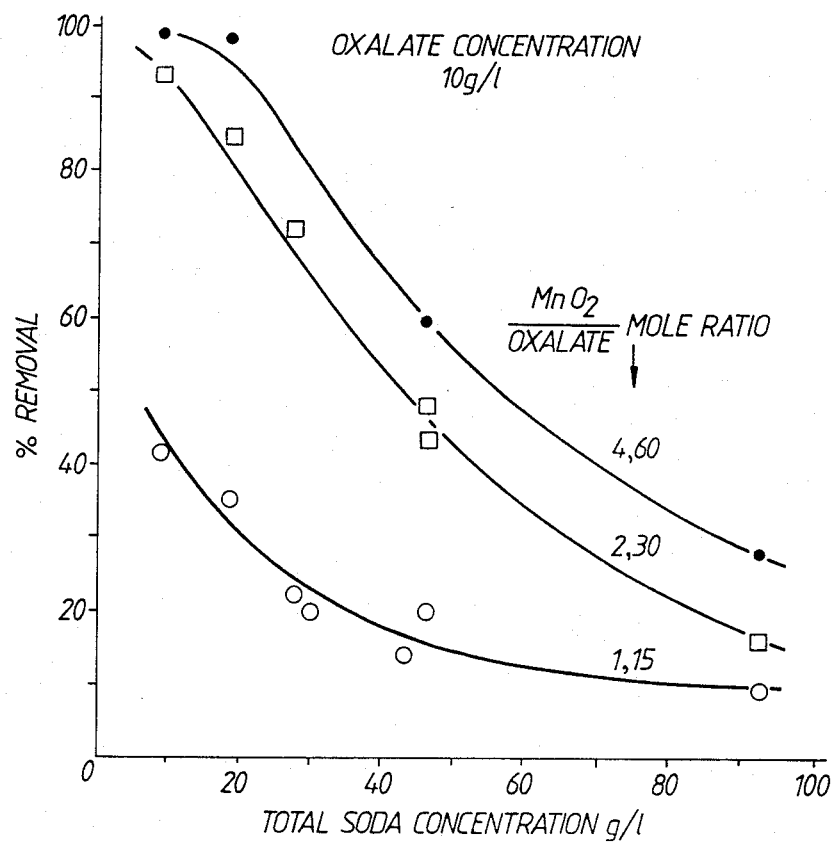
FIG. 2 is a plot of % oxidation of sodium oxalate vs total soda concentration in synthetic Bayer liquors.

It will also be evident from FIG. 2 that at the higher mole ratios of manganese dioxide to oxalate higher levels of oxidation of oxalate were recorded. This indicates that significant oxalate removal is possible at relatively high soda concentrations if high manganese dioxide ore loadings are used.

In a second series of experiments on synthetic liquor the effect of changing manganese dioxide ore and ore particle size on oxalate oxidation was investigated. Two types of manganese dioxide ore from Groote Eylandt were used, namely premium grade fines (PGF) and metallurgical grade fines (MGF). The manganese dioxide ore was added to samples of synthetic liquor having a total soda concentration of 93.5 g/l (as $Na_2CO_3$), and the mole ratio of manganese dioxide to oxalate in each sample was 2.30:1.

The results are shown in table 1 below:

TABLE 1

| The Effect of Ore Type and Size | | |
|---|---|---|
| Ore Type | Ore Size | % Oxalate Oxidation |
| PGF | −1 mm | 15.9 |
| PGF | −300 μm | 35.7 |
| MGF | −1 mm | 6.3 |
| MGF | −300 μm | 34.3 |
| ICS5 | −100 μm | 67.6 |

It can be seen from the table that the smaller particle size (−300 micron) for both PGF and MGF results in higher levels of oxalate oxidation.

2. Oxidation of organic Material in actual Bayer liquors-low soda concentrations The actual Bayer liquors comprised seed wash liquors with a relatively low total soda concentration of 18.24 grams per liter.

The experimental runs used 200 ml volumes of seed wash liquor in a 250 ml capacity cylindrical digestor which was heated externally by means of a Bunsen burner while being rotated at 60 rpm. The temperature was monitored with a thermometer inserted into the base of the digestor and controlled plus or minus 5° C. of the desired operating condition manually over the duration of each run. The total caustic to total soda, and alumina to total caustic ratios of the seed wash liquor were 0.83 and 0.31, respectively. Complete analysis of the seed wash liquor is set out in Table 2 below.

TABLE 2

| | # SEED WASH LIQUOR |
|---|---|
| $Al_2O_3$ (A)* | 4.68 |
| Caustic (C) | 15.09 |
| Total Soda (S) | 18.24 |
| Ratio A/C | 0.31 |
| Ratio C/S | 0.83 |
| Carbonate | 3.15 |
| TOOC | 23.21 |
| Oxalate | 3.89 |

Concentrations in g/l expressed as $Na_2CO_3$
*g/l of $Al_2O_3$ as $Al_2O_3$

It should be noted that TOOC as used throughout this specification is understood to mean total oxidisable organic carbon.

The amount of manganese dioxide ore used was varied from 100 to 600 grams per liter of seed wash liquor. The digestions of the seed wash liquor and manganese dioxide ore were carried out in one hour at three different temperatures, 160°, 200° and 260° C. The ore was obtained from Groote Eylandt and was either MGF or PGF crushed to 99% passing 1 mm. The MGF and some of the PGF ore was screened further to remove particles less than 0.5 mm.

After each run the reaction vessel was cooled rapidly in water and then weighed to check on losses through either leakage or evaporation. The contents were filtered and the solid residues were washed with water and dried at 80°–90° C., then weighed.

The filtrates were analysed for sodium oxalate, carbonate and total oxidisable organic carbon, and manganese. The analysis for oxalate was made by oxidation with ceric perchlorate. Carbonate and organic carbon were determined using a Dohrmann Carbon Analyser.

Figure 3:
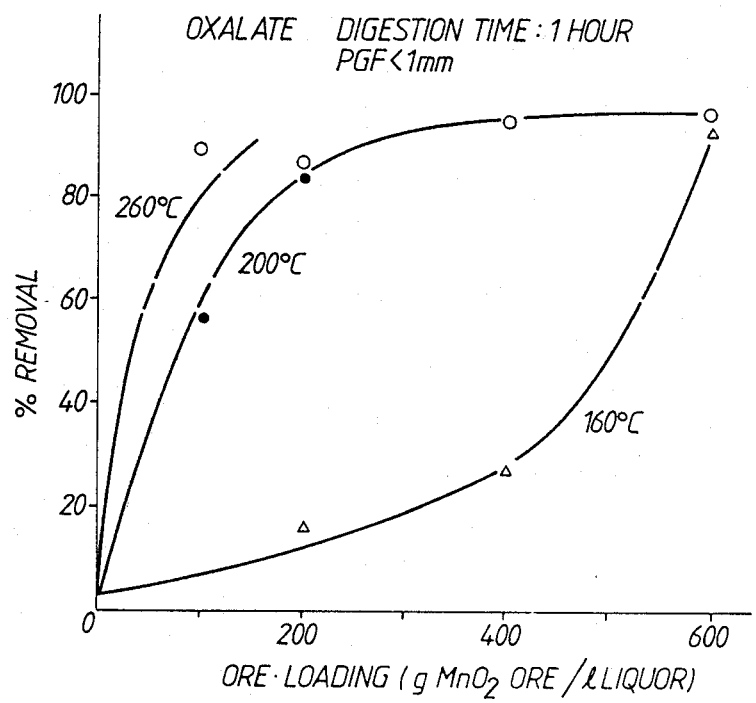
FIG. 3 is a plot of % removal of oxalate vs manganese dioxide ore loading in actual Bayer liquors having low soda concentrations.

FIG. 3 is a plot of % oxalate removal vs manganese dioxide ore loading (PGF fines, particle size<1 mm) derived from the results of the experimental work described in the foregoing. The figure shows an increase in percentage of oxalate removal at higher temperatures and manganese dioxide ore loadings. For example, at least 90% of the oxalate was removed at 200° C. with an ore loading of 200 grams per liter. At 260° C. a similar rate of removal was achieved with a manganese dioxide ore loading of 100 grams per liter.

Figure 4:
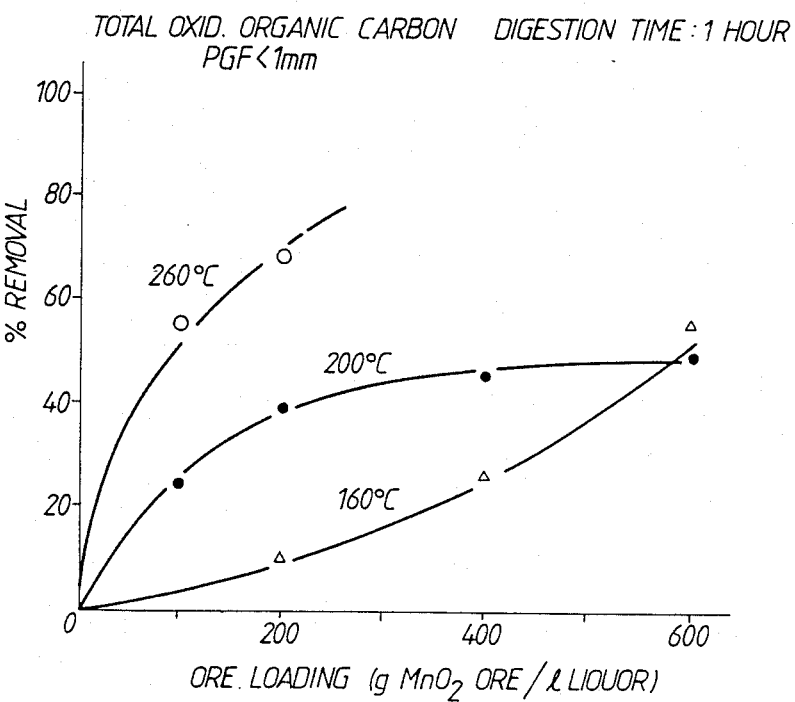
FIG. 4 is a plot of % removal of total organic carbon vs manganese dioxide ore loading in actual Bayer liquors having low soda concentrations.

FIG. 4 is a plot of % removal of total organic carbon vs manganese dioxide ore loading (PGF fines, 1 mm), and shows that there was an increase in % removal of organic material in general including oxalate from the seed wash liquor as the temperature and manganese dioxide ore loadings increased. For example, between 40 to 50% of the total organic carbon was removed at 200° C. at a manganese dioxide ore loading higher than 200 grams per liter.

As will be evident from FIGS. 3 and 4, an increase in manganese dioxide ore loadings above 200 grams/liter did not seem to be beneficial if the temperature was maintained at or above 200° C. However, at 160° C. a significant increase in the % removal of oxalate and total organic carbon, respectively, was achieved as the manganese dioxide ore loading increased.

3. Oxidation of organic material in actual Bayer liquors-high soda concentrations The experiments were designed to simulate conditions during the digestion stage of the Bayer process.

All of the experiments were carried out using 170 ml of spent liquor (i.e. recycled sodium aluminate solution) in a 250 ml capacity cylindrical digestor which was heated externally by a Bunsen burner while being rotated at 60 rpm. The components for the digestion (set out in Table 3 below) were carefully weighed, added to the digestor and the mixture was then heated to 250° C. within 5 minutes. This temperature was maintained for 7 minutes and the digestor was subsequently cooled in air to 100° C. within 30 minutes.

In total, 20 digestion experiments were carried out with bauxite as the alumina source and with varying amounts of manganese dioxide ore within the ranges set out in Table 3 below.

TABLE 3

| Components used in the Digestion | |
|---|---|
| Components | Quantity |
| Spent liquor | 170 ml |
| Water | 30 ml |
| Ca(OH)$_2$ | 0.17 g |
| MnO$_2$ ores (PGF or MGF) | 0-0.44 g |
| Bauxite | 22.50 g |

After the digestion, the liquor was recovered and then combined with the residue wash solution into a 500 ml volumetric flask. This procedure was necessary to ensure that all the carbon from the liquor was recovered. The solution was then analysed and the total masses of organic and inorganic carbonate were derived from mass balance calculations.

The concentration of caustic in the spent liquors varied from 217 to 225g/l.

Two grades of manganese dioxide ore from Groote Eylandt were used in the experiments. The PGF had a silica content of 3.52% (0.7% as extractable SiO$_2$) whereas the MGF contained 6.1% silica. The major components of the two grades of manganese dioxide ores are tabulated in Table 4 below.

TABLE 4

| Percentage of Major Components in MnO$_2$ Ores | | |
|---|---|---|
| Composition | MGF | PGF |
| Mn$_T$ | 48.4 | 52.3 |
| Fe | 4.0 | 2.6 |
| SiO$_2$ | 6.1 | 3.52 |
| Al$_2$O$_3$ | 4.0 | 2.95 |
| K$_2$O | 1.13 | 0.59 |
| CaO | 0.05 | 0.04 |
| BaO | 1.86 | 1.56 |
| TiO$_2$ | 0.16 | 0.14 |

Details of the experiments are set out in Table 5 below.

TABLE 5

| | MnO$_2$/Baux Wt % | Mn Ore | Increase in Carbonate (g) | Effective Removal (g/l) |
|---|---|---|---|---|
| 1 | 0 | Blank | .271 | .42 |
| 2 | .49 | PGF | .350 | 3.92 |
| 3 | .98 | PGF | .638 | 8.00 |
| 4 | .98 | MGF | .709 | 7.67 |
| 5 | 0 | Blank | .406 | .58 |
| 6 | 1.96 | PGF | .604 | 4.58 |
| 7 | 1.96 | MGF | .540 | 4.33 |
| 8 | .49 | MGF | .433 | .25 |
| 9 | .26 | PGF | .437 | 3.67 |
| 10 | .74 | PGF | .397 | 3.50 |
| 11 | 1.23 | PGF | .393 | 3.17 |
| 12 | 1.48 | PGF | .463 | 3.33 |
| 13 | 0 | Blank | .306 | 1.58 |
| 14 | .25 | MGF | .262 | 1.08 |
| 15 | .74 | PGF | .258 | 1.25 |
| 16 | 1.47 | MGF | .300 | 1.33 |
| 17 | .98 | PGF | .442 | 2.17 |
| 18 | .98 | PGF | .623 | 3.42 |
| 19 | .98 | MGF | .454 | 3.33 |
| 20 | 1.96 | MGF | .421 | 4.50 |

The values in the column headed "Increase in Carbonate" are the difference between the amount of carbonate in the liquor and the solids prior to and after digestion. The values in the column headed "Effective Removal" are the difference between the amount of organic carbon in the liquor only prior to and after digestion.

Figure 5:
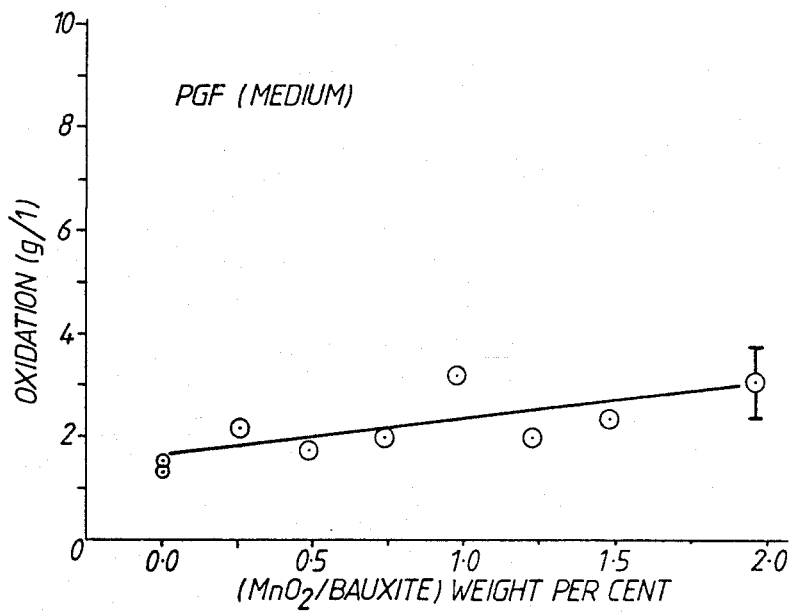
FIGS. 5 and 6 are plots of oxidation of organic material vs manganese dioxide ore loadings in actual Bayer liquors having high soda concentrations.
Figure 6:
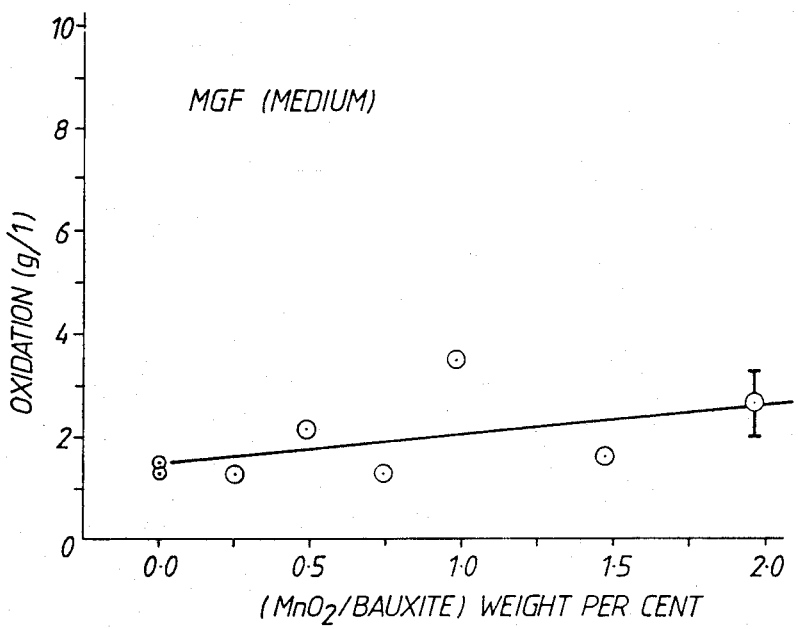

FIGS. 5 and 6 show the relationship between oxidation of organic material and manganese dioxide ore loadings where the source of ore is PGF and MGF, respectively. The plots shown in the figures were derived from the data shown in Table 4 above. The values of oxidation in g/l are based on the increase in carbonate and the manganese dioxide ore loadings are expressed as the ratio of manganese dioxide ore to bauxite on a weight per cent basis. It is thought on economic grounds that the ratio should remain less than 2 per cent, that is less than 0.02:1.

As can be seen from both FIGS. 5 and 6, as the manganese dioxide ore loading increases there is an increase in the oxidation of organic material.

In practice, under actual Bayer process conditions, it is known that there is a net increase in organic material with each digestion cycle. This would seem to be at variance with the results for the blank runs (i.e. no manganese dioxide ore added) shown in FIGS. 5 and 6 where in the order of 1.5 g/l organic material was oxidised. A significant proportion of this oxidation can be attributed to the presence of a relatively substantial volume of air in the digestor during each experimental run Under actual Bayer process conditions the amount of air present in the digestor would cause only minimal oxidation. Therefore, considering the results shown in FIGS. 5 and 6 in relation to actual Bayer process conditions the straight lines shown in the figures should be translated downward so that the zero point (i.e. where there is no manganese dioxide ore added) results in an increase in organic material. It should be emphasized that even under these circumstances the addition of manganese dioxide ore is beneficial since, at low manganese dioxide ore loadings with each cycle the rate of increase of organic carbon in the Bayer liquor will be reduced Further, at higher manganese dioxide ore loadings given the slope of the straight line, there would be a net reduction in organic carbon with each cycle.

The data generated from the experiments also indicated that there is little variation in the level of oxalate in the Bayer liquors with increasing manganese dioxide ore loadings. It was found that the level of oxalate in experiments where manganese dioxide ore was added is substantially the same as the level of oxalate in experiments where no manganese dioxide ore was added. This suggests that the higher molecular weight organic materials in the Bayer liquors decomposed by an oxidation mechanism to form oxalate, and that the manganese dioxide ore also oxidises some of the existing oxalate and the newly formed oxalate to carbonate.

In order to further investigate the identity of the organic materials being oxidised from the Bayer liquors, ultraviolet light absorption experiments were carried out on a synthetic liquor containing 2 g/l sodium humate, which is one of the higher molecular weight organic materials, i.e. organic materials having molecular weight in excess of 500. The results of the experiments indicated that the Bayer liquor had a decreased intensity of colour when compared with that of Bayer liquor without manganese dioxide ore addition. This supports the view that the addition of manganese dioxide ore in Bayer liquors leads to the oxidation of higher molecular weight organic materials in the Bayer liquor.

In summary, the findings of the research work on synthetic and actual Bayer liquors, discussed in items 1 to 3 above, indicate that organic materials can be removed from Bayer liquors by the addition of manganese dioxide. In particular, the results show that manganese dioxide ore can oxidise:

(a) oxalate from Bayer liquors having either high or low soda concentrations, although better oxidation rates are achieved in Bayer liquors having low soda concentrations, and (b) higher molecular weight organic material from Bayer liquors having either high soda concentrations, such as at the digestion stage of the Bayer process, or low soda concentrations.

The oxidation of the higher molecular weight organic material by manganese dioxide ore is significant in terms of the oxalate concentration in Bayer liquors since higher molecular weight organic material decomposes to form oxalate. Thus, a reduction in the concentration of the higher molecular weight organic material means there will also be a reduction in the rate of increase of the concentration of oxalate. The oxidation of higher molecular weight organic material is also significant since such organic material causes discolouration of the product alumina. In many established alumina plants alumina discolouration is considered to be a significant problem. Thus, it can be appreciated that the addition of manganese dioxide ore to Bayer liquors in these plants would be of benefit, since there will be a reduction in the discolouration of the product alumina.

Manganese dioxide is readily available in large quantities, relatively inexpensive and convenient to use. Furthermore, manganese dioxide does not have any of the health or safety disadvantages associated with oxidants such as hydrogen peroxide and ozone. In the case of addition of manganese dioxide ore to the digestion stage of the Bayer process, no capital expense would be necessary. This represents a significant advantage over processes in which air or oxygen is the oxidant, since these processes require elevated temperature and pressure, and this results in significant capital expense.

In relation to oxidation of oxalate in Bayer liquors having low soda concentrations, in one embodiment of the invention the seed particle washing step 5(b) shown in FIG. 1 is modified to include oxalate removal by oxidation with manganese ore.

Figure 7:
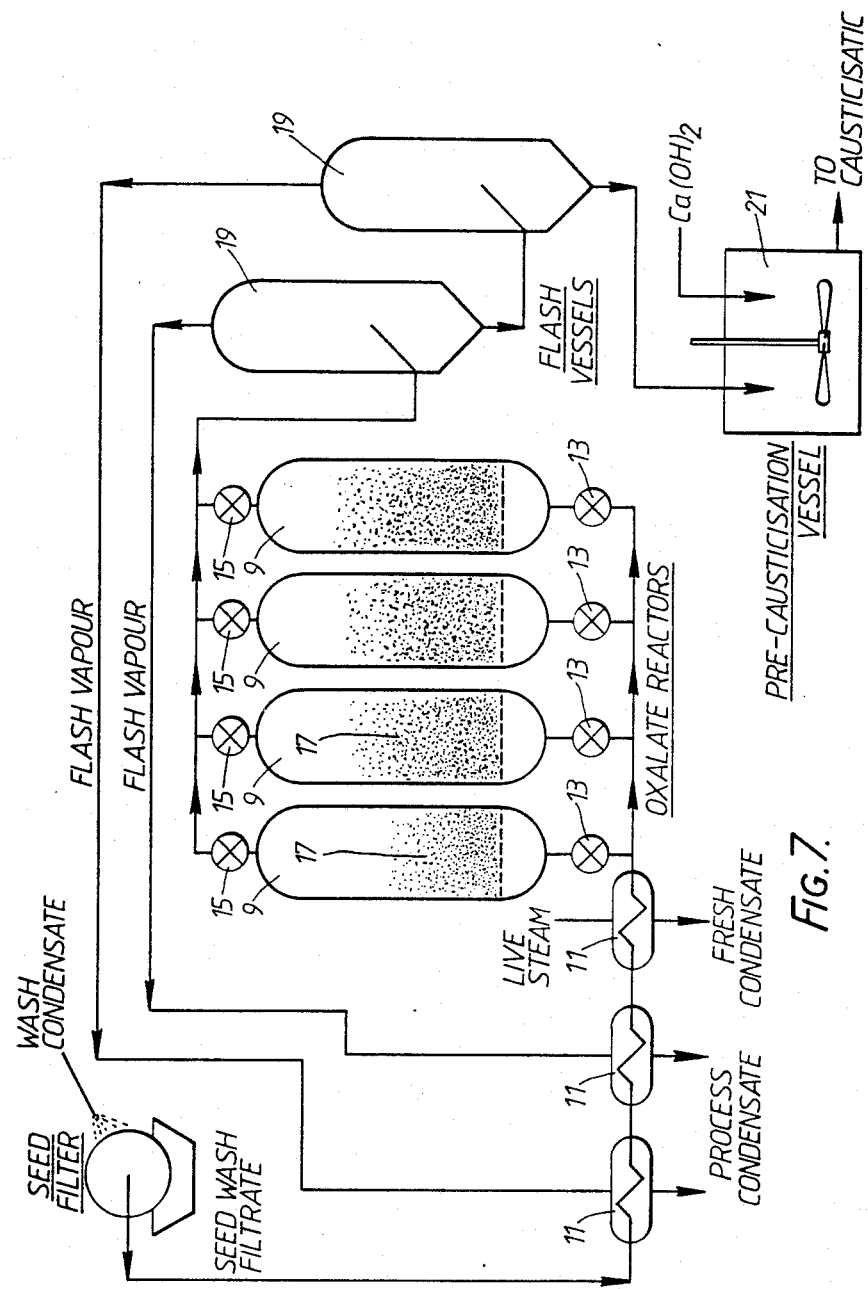
FIG. 7 is a schematic drawing showing modifications to the conventional Bayer process shown in FIG. 1 to carry out the process in accordance with the present invention.

In this regard, with reference to FIG. 7, the seed wash filtrate formed during step 5(b) above is transferred from the seed filtration apparatus 7 to a series of fluidized bed or other type of reactors 9. Before reaching the fluidized bed reactors 9, the wash filtrate is passed through heat exchangers 11 which heat the wash filtrate to a suitable temperature. For illustration purposes only, four fluidized bed reactors 9 are shown in the figure, each reactor 9 having separate inlet valves 13 at the base for the introduction of wash filtrate and separate outlet valves 15 at the top for the removal of treated solution. In use, the total free volume of the fluidized bed reactors on line at any one time is sufficient to achieve an adequate time of reaction, that is the reaction mixture has an adequate residence time in the reactors. Each fluidized bed reactor 9 is filled with crushed or ground solid manganese dioxide 17. The introduction of the wash filtrate solution into the fluidized bed reactors 9 results in the oxidation of the oxalate by reaction with the manganese dioxide. In each case the products of reaction include sodium carbonate in solution and precipitated manganese compounds which remain in the fluidized beds. Thus, with time the amount of manganese dioxide in the beds reduces and eventually there is exhaustion of the manganese dioxide below the minimum stoichiometric ratio $MnO_2:Na_2C_2O_4$ for efficient reaction.

At this time it is necessary to replace the reacted manganese dioxide in each fluidized bed reactor 9. The reacted manganese dioxide could be regenerated and subsequently reused in the fluidized bed reactors 9. It can readily be appreciated that the time required to totally exhaust the manganese dioxide varies with the residence time of the wash filtrate in the fluidized bed reactors 9, the temperature of the incoming wash filtrate solution and the mole ratio of manganese and oxalate.

These parameters also have an effect on the percentage of oxalate in the wash filtrate solution which is oxidised, and thus removed from solution. Typically, selection of the operating conditions so that the wash filtrate residence time is between 0.5 and 4 hours, the wash filtrate temperature is between 100° C. and 270° C., and the mole ratio of manganese dioxide ion and oxalate is greater than 3 will provide satisfactory reduction of oxalate concentration in the wash filtrate solution.

Further it is evident from a mathematical process known as Single Factor Extrapolation calculations carried out that there is a large range of possible variation in three parameters which result in 100% oxidation of the oxalate, and that one set of optimum conditions would be to use manganese dioxide in a manganese dioxide ion to oxalate mole ratio of 8.37, with the wash filtrate solution at 240° C. and a three hour residence time. However, if 100% oxidation is not considered to be practical in view of the large amounts of manganese dioxide required, efficient results could still be obtained with lower overall oxidation rates. For example, it has been found experimentally that reuse of an amount of manganese ore to oxidise seven separate feed streams, with the first feed stream having oxalate in a manganese ion to oxalate mole ratio of 8.37, results in a cumulative oxalate oxidation rate of 62%. Under these conditions there was found to be a manganese ore utilization of 1.56 grams of ore per gram of oxalate removed, at an apparent stoichiometry of 1.93 between the manganese dioxide and oxalate.

Following the required residence time within each fluidized bed reactor 9 the solution containing sodium carbonate and unreacted oxalate is transferred through the outlet valves 15 in each fluidized bed reactor 9 to successive flash vessels and associated heat exchangers 19 to cool the solution to a suitable temperature in the order of 100° C. The cooled solution is then treated with calcium hydroxide in a conventional precausticisation vessel 21 to convert the sodium and carbonate to sodium hydroxide nd calcium carbonate precipitate. The entire reacted slurry formed in the vessel 21 is then pumped to the caustification plant 23 (FIG. 1) or the red mud settler washer 25 (FIG. 1) and the liquid component comprising sodium hydroxide and unreacted oxalate is recycled for use in digestion step 1 above.

It can readily be appreciated that whilst the Bayer liquor treated with manganese dioxide comprises the seed wash liquor, any suitable Bayer liquor could be used. For example, as an alternative the sodium aluminate solution remaining after the precipitation step 3 could be treated in a similar manner to that described above.

Further, whilst the process described operates with a continuous feed of wash filtrate through the bed reactors 9, it can readily be appreciated that the process could be modified to operate on a batch basis.

We claim:

1. In a process for making alumina including the steps of digesting bauxite containing organic impurities in sodium hydroxide solution to form a solution containing sodium aluminate and organic impurities, precipitating aluminum hydroxide from said solution containing sodium aluminate and organic impurities to form at least one solution containing organic impurities, recycling at least one solution, containing organic impurities, formed by said precipitation of said aluminum hydroxide, to said digestion step, and calcining said precipitate of aluminum hydroxide to form alumina, the improvement of comprising contacting at least one of said solutions containing organic impurities with manganese dioxide in an amount effective to oxidize said organic impurities and so limit the accumulation of organic material in said process.

2. The process as claimed in claim 1, wherein the sodium hydroxide concentration of said at least one solution contacted with manganese dioxide ore is less than 50 grams per liter.

3. The process as claimed in claim 1 wherein the sodium hydroxide concentration of said at least one solution contacted with manganese dioxide ore is between 15 and 35 grams per liter.

4. The process as claimed in claim 1, wherein said precipitation step comprises precipitating aluminum hydroxide from said solution containing sodium aluminate, separating said precipitated aluminum hydroxide from said solution containing sodium aluminate to form a spent liquor solution containing organic impurities, recycling said spent liquor solution to said digestion step, separating said precipitated aluminum hydroxide into a fine particle size fraction and a large particle size fraction, feeding said large particle size fraction to said calcining step, washing said fine particle size fraction with water to form a seed wash filtrate containing organic impurities and a washed seed precipitate, seeding said washed seed precipitate to said solution containing sodium aluminate to aid the precipitation of aluminum hydroxide, and recycling said seed wash filtrate to said digestion step.

5. The process as claimed in claim 4, wherein said seed wash filtrate is heated to between 100° C. and 200° C. and contacted with said manganese dioxide ore, whereby manganese dioxide is present in a concentration of greater than 200 grams per liter of seed wash filtrate.

6. The process as claimed in claim 4, wherein said seed wash filtrate is heated to a temperature in excess of 200° C. and contacted with said manganese dioxide ore, whereby manganese dioxide is present in an amount of less than 200 grams per liter of seed wash filtrate.

7. The process as claimed in claim 4, wherein said seed wash filtrate is passed through a fluidized bed reactor containing manganese dioxide ore, the temperature of said seed wash filtrate being maintained between 100° C. and 270° C. and the residence time of said seed wash filtrate within said reactor being between 0.5 to 4 hours.

8. The process as claimed in claim 7, wherein said seed wash filtrate contains oxalate ions, and the mole ration of manganese ions to oxalate ions is greater than 3.

9. The process as claimed in claim 1, wherein said manganese dioxide ore is contacted with said solution containing sodium aluminate during digestion of said bauxite.

10. The process as claimed in claim 9, wherein the weight ratio of manganese dioxide to bauxite is less than 0.02:1.

11. The process as claimed in claim 1, wherein said at least one of said solutions is contacted with manganese dioxide ore by directly adding manganese dioxide ore to said solution.

* * * * *

UNITED STATES PATENT AND TRADEMARK OFFICE
CERTIFICATE OF CORRECTION

PATENT NO. : 4,836,990
DATED : June 6, 1989
INVENTOR(S) : SWINKELS et al

It is certified that error appears in the above-identified patent and that said Letters Patent is hereby corrected as shown below:

Column 13, line 15, "of comprising" should read --comprising--;

line 22, "dioxide ore is" should read --dioxide is--;

line 26, "dioxide ore is" should read --dioxide is--.

Column 14, line 8, "dioxide ore," should read --dioxide,--;

line 14, "dioxide ore," should read --dioxide,--;

line 19, "dioxide ore," should read --dioxide,--;

line 29, "dioxide ore " should read --dioxide,--;

line 37, "dioxide ore by directly adding manganese dioxide ore" should read --dioxide by directly adding manganese dioxide--, Signed and Sealed this Fourteenth Day of January, 1992

Attest:

HARRY F. MANBECK, JR.

*Attesting Officer*        *Commissioner of Patents and Trademarks*